United States Patent
Prociw et al.

(10) Patent No.: US 11,788,723 B2
(45) Date of Patent: *Oct. 17, 2023

(54) FUEL INJECTION FOR INTEGRAL COMBUSTOR AND TURBINE VANE

(71) Applicant: Collins Engine Nozzles, Inc., Des Moines, IA (US)

(72) Inventors: Lev A. Prociw, Johnston, IA (US); Jason Ryon, Carlisle, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,342

(22) Filed: Jun. 30, 2022

(65) Prior Publication Data

US 2022/0333777 A1 Oct. 20, 2022

Related U.S. Application Data

(63) Continuation of application No. 16/696,450, filed on Nov. 26, 2019, now Pat. No. 11,480,337.

(51) Int. Cl.
*F23R 3/00* (2006.01)
*F02C 7/12* (2006.01)
(Continued)

(52) U.S. Cl.
CPC .............. *F23R 3/002* (2013.01); *F23R 3/005* (2013.01); *F02C 7/12* (2013.01); *F02C 7/222* (2013.01);
(Continued)

(58) Field of Classification Search
CPC .. F23R 3/002; F23R 3/005; F23R 3/50; F23R 3/52; F23R 2900/03043; F23R 3/346; F05D 2260/204; F01D 9/047; F02C 7/222
See application file for complete search history.

(56) References Cited

U.S. PATENT DOCUMENTS 3,706,203 A 12/1972 Goldberg et al.
4,244,178 A 1/1981 Herman et al.
(Continued)

FOREIGN PATENT DOCUMENTS

JP 2008274774 A 11/2008

OTHER PUBLICATIONS

Extended European Search Report dated Apr. 22, 2021, issued during the prosecution of European Patent application No. EP 20206634.6.

*Primary Examiner* — Gerald L Sung
*Assistant Examiner* — Rene D Ford
(74) *Attorney, Agent, or Firm* — Locke Lord LLP; Scott D. Wofsy; Joshua L. Jones

(57) ABSTRACT

A system includes a combustor. The combustor has a combustor wall with a combustor dome at an upstream end of the combustor wall, and an outlet at a downstream end of the combustor wall opposite the upstream end. The combustor wall includes an inner wall portion and an outer wall portion defining an interior of the combustor therebetween. Each of the inner wall portion and outer wall portion extends from the combustor dome to the downstream end of the combustor wall. The combustor wall includes an air cooling passage embedded inside at least one of the inner wall portion and the outer wall portion. The air cooling passage extends from the upstream end of the combustor wall to the downstream end of the combustor wall.

15 Claims, 4 Drawing Sheets

(51) Int. Cl.
 *F02C 7/22* (2006.01)
 *F23R 3/50* (2006.01)
 *F23R 3/40* (2006.01)

(52) U.S. Cl.
 CPC .......... *F05D 2260/204* (2013.01); *F23R 3/40* (2013.01); *F23R 3/50* (2013.01); *F23R 2900/03043* (2013.01)

(56) References Cited

U.S. PATENT DOCUMENTS

| | | | |
|---|---|---|---|
| 5,865,030 A | | 2/1999 | Matsuhama |
| 6,295,801 B1 | * | 10/2001 | Burrus ...................... F23R 3/12 60/737 |
| 9,404,654 B2 | | 8/2016 | Cunha et al. |
| 9,482,432 B2 | | 11/2016 | Cunha et al. |
| 9,810,186 B2 | | 11/2017 | Mansour et al. |
| 9,822,649 B2 | | 11/2017 | Davis, Jr. et al. |
| 10,393,382 B2 | | 8/2019 | Boardman et al. |
| 2009/0094986 A1 | | 4/2009 | Bottcher et al. |
| 2012/0198854 A1 | | 8/2012 | Schilp et al. |
| 2013/0014512 A1 | | 1/2013 | Jarmon et al. |
| 2014/0216043 A1 | | 8/2014 | Cai et al. |
| 2017/0067635 A1 | | 3/2017 | Zong et al. |
| 2017/0138201 A1 | | 5/2017 | Takata |
| 2017/0299187 A1 | | 10/2017 | Berry et al. |
| 2019/0234310 A1 | | 8/2019 | Morenko et al. |

* cited by examiner

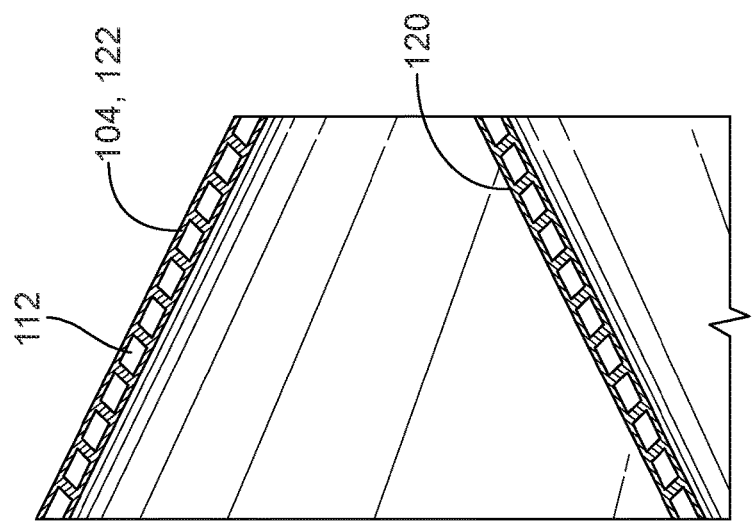
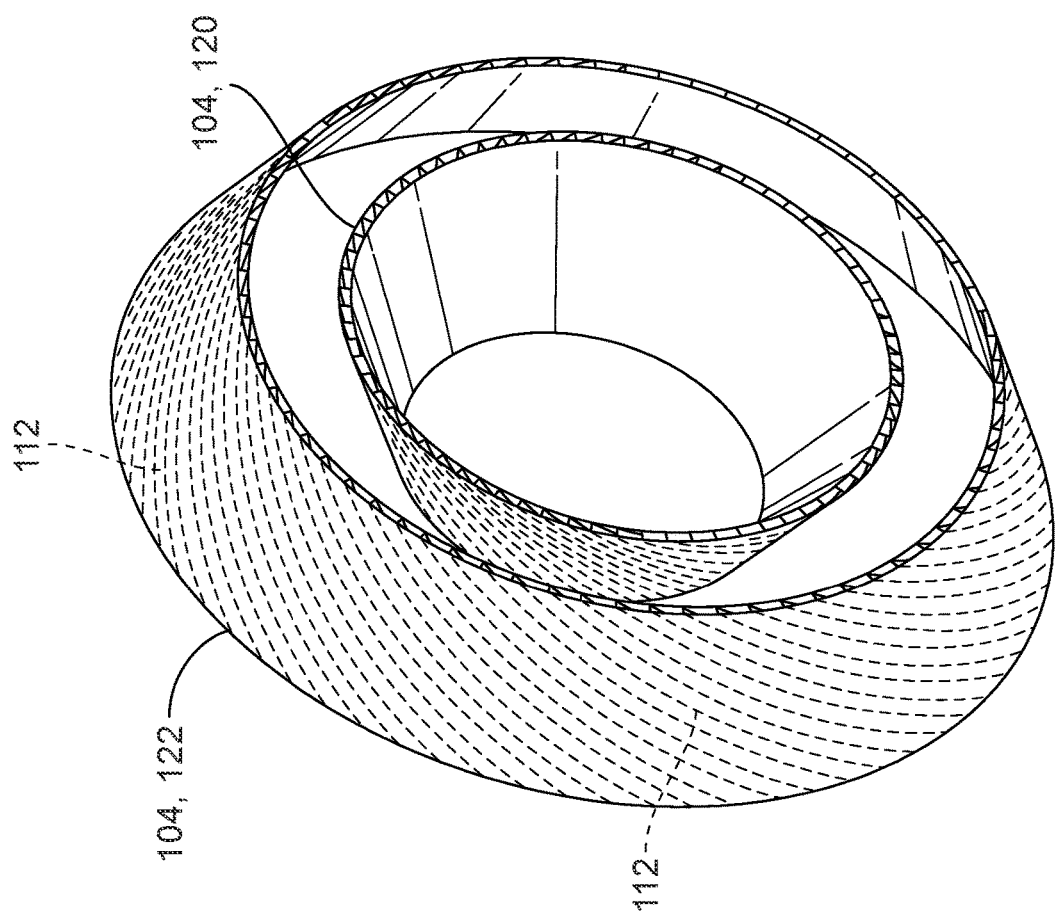

FUEL INJECTION FOR INTEGRAL COMBUSTOR AND TURBINE VANE

CROSS-REFERENCE TO RELATED APPLICATIONS

This is a continuation of U.S. patent application Ser. No. 16/696,450 filed Nov. 26, 2019 the contents of which are incorporated by reference herein in their entirety.

BACKGROUND

1. Field

The present disclosure relates to turbomachines, and more particularly to systems for fuel injection and combustion in turbomachines.

2. Description of Related Art

Cost and weight reduction and durability improvement is a driving motive for future aerospace engines. The conventional techniques have been considered satisfactory for their intended purpose. However, there is an ever present need for improved systems and methods for improved systems for fuel injection and combustion in turbomachines. This disclosure provides a solution for this need.

SUMMARY

A system includes a combustor. The combustor has a combustor wall with a combustor dome at an upstream end of the combustor wall, and an outlet at a downstream end of the combustor wall opposite the upstream end. The combustor wall includes an inner wall portion and an outer wall portion defining an interior of the combustor therebetween. Each of the inner wall portion and outer wall portion extends from the combustor dome to the downstream end of the combustor wall. The combustor wall includes an air cooling passage embedded inside at least one of the inner wall portion and the outer wall portion. The air cooling passage extends from the upstream end of the combustor wall to the downstream end of the combustor wall.

One or more turbine inlet stator vanes can be included in the outlet of the combustor. The cooling passage can have an outlet positioned downstream of the inlet stator vane. The turbine inlet stator vane can be one of a plurality of circumferentially spaced apart turbine inlet stator vanes in the outlet of the combustor. The cooling passage can be one of a plurality of circumferentially spaced apart cooling passages through the combustor wall. The plurality of circumferentially spaced apart cooling passages through the combustor wall can be embedded in the inner portion of the combustor wall and/or in the outer portion of the combustor wall. Each cooling passage can have a respective inlet at the upstream end of the combustor wall and a respective outlet at the downstream end of the combustor wall, and need not include any other inlets or outlets. The cooling passages can follow a helical pattern around the combustor wall. An ignition boss can be defined in the combustor wall for passage of an ignitor though the combustor wall, wherein the cooling passages conform around the ignitor boss.

A multipoint fuel injection system can be included in the combustor dome. The multipoint fuel injection system can include a plurality of fuel injectors with air passages extending through the combustor dome for communication of compressor discharge air through the combustor dome into the combustor for combustion. The multipoint fuel injection system can include a fuel manifold in fluid communication with the fuel injectors for injecting fuel with the compressor discharge air for atomization of the fuel for combustion in the combustor. The manifold, combustor wall, and turbine inlet stator vane can all be of a monolithic construction. The manifold can be a multistage manifold with a plurality of fluidly isolated fuel circuits defined therein for staging flow to the injectors. The manifold can be mounted to a cowl extending upstream of the combustor dome.

A high pressure engine case can be included, wherein the manifold, combustor dome, combustor wall, and turbine inlet stator vane are all within the high pressure engine case. The high pressure engine case can include an inlet for supplying compressor discharge air. The combustor wall can be spaced apart from both in inner case wall of the high pressure engine case radially inward from the combustor wall, and a radially outer case wall of the high pressure engine case radially outward from the combustor wall. The combustor wall can define integral internal fins for conducting heat from an inner surface of the combustor wall to an outer surface of the combustor wall for heat transfer from the combustor wall to a space between the combustor wall and the radially inner and outer case walls.

A method includes flowing air through a cooling passage embedded within a combustor wall and cooling the combustor wall with the compressor discharge air flowing through the cooling passage. The method can include discharging the compressor discharge air from an outlet of the cooling passage downstream of a turbine inlet stator vane, wherein pressure drop between the inlet of the cooling passage and an area downstream of the turbine inlet stator vane drives flow through the cooling passage.

The method can include injecting compressor discharge air and fuel through a combustor dome at an upstream end of the combustor wall in in multipoint fuel injection for combustion within the combustor wall. The method can include staging flow of fuel in multipoint injection using a manifold with a plurality of fluid isolated fuel circuits defined therein, wherein the manifold is located inside a high pressure engine case. Substantially all of the compressor discharge air can be accounted for in the multipoint injection and cooling the combustor wall. Cooling the combustor wall can include conducting heat from an interior surface of the combustor wall to an external surface of the combustor wall through internal fins defined within the combustor wall.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a schematic perspective view of a configuration of the cooling channels of FIG. 2 in a helical pattern;

FIG. 4 is a schematic cross-sectional side elevation view of the cooling channels of FIG. 3;

DETAILED DESCRIPTION OF THE PREFERRED EMBODIMENTS

Figure 1:
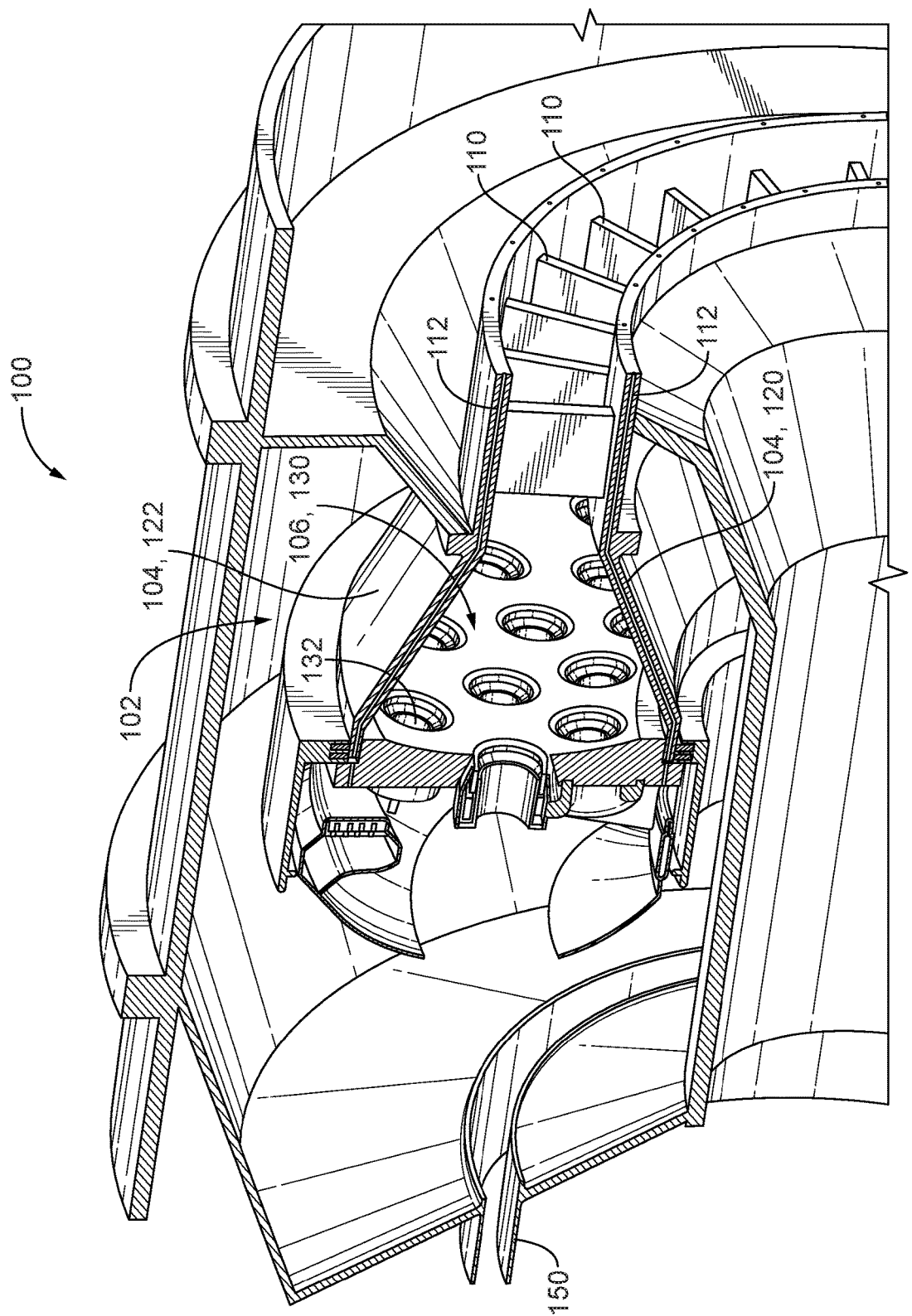
FIG. 1 is a schematic perspective view of an embodiment of a system constructed in accordance with the present disclosure, showing the engine case, combustor dome with multipoint fuel injection, combustor wall, and integral turbine vanes.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to provide multipoint injection in gas turbine engines.

A system includes a combustor 102. The combustor 102 includes a combustor wall 104 with a combustor dome 106 at an upstream end 114 of the combustor wall 104, and an outlet 108 at a downstream end 116 of the combustor wall 104 opposite the upstream end 114. A plurality of turbine inlet stator vanes 110 are included in the outlet 108 of the combustor 102, circumferentially spaced apart from one another.

Figure 2:
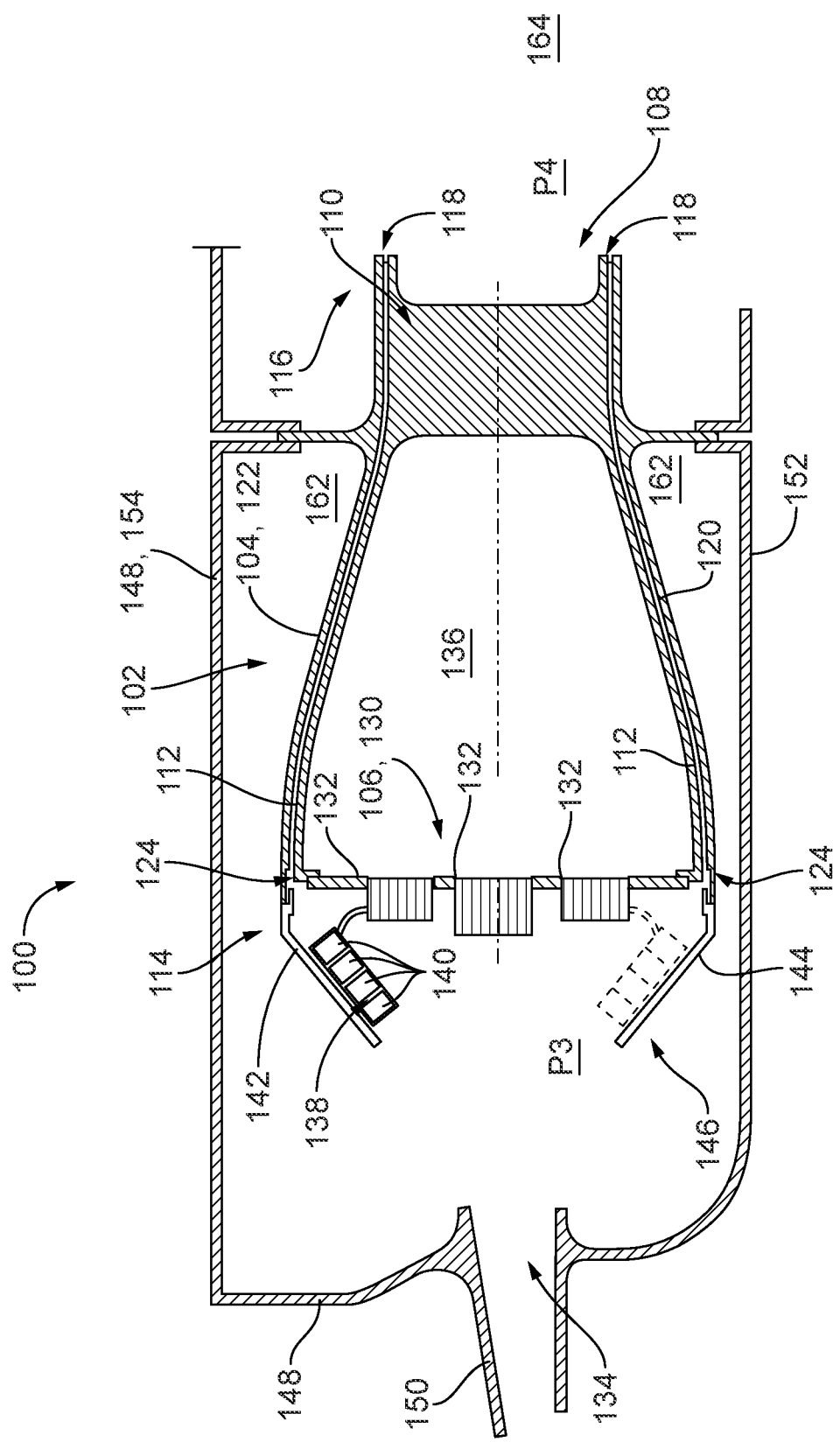
FIG. 2 is a schematic cross-sectional elevation view of the system of FIG. 1, showing the cooling channels through the combustor wall.
Figure 6:
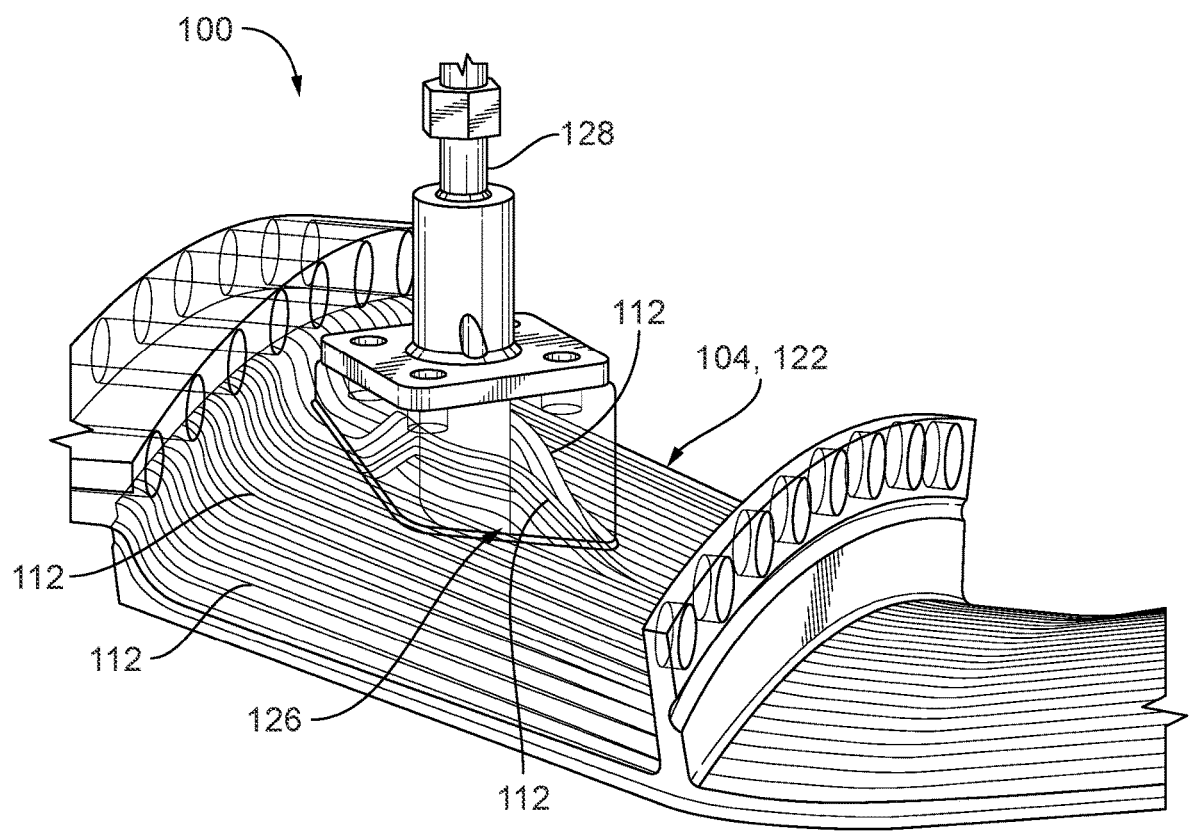
FIG. 6 is a schematic perspective view of the system of FIG. 1, showing an ignition boss with the cooling channels conforming around the ignition boss.

With reference now to FIG. 2, the combustor wall 104 includes a plurality of air cooling passage 112 embedded therein extending from the upstream end 114, to the downstream end 116. Each cooling passage 112 has an outlet 118 positioned downstream of the turbine inlet stator vane 110. The inner combustor wall portion 120 includes a plurality of circumferentially spaced apart cooling passages 112, and the outer combustor wall portion 122 also includes a plurality of circumferentially spaced apart cooling passages 112. Each cooling passage 112 has a single respective inlet 124 at the upstream end 114 of the combustor wall 104 and a single respective outlet 118 at the downstream end 116 of the combustor wall, and need not include any other inlets or outlets. The combustor wall 104 is not perforated with cooling holes. As shown in FIGS. 3-4, the cooling passages 112 can follow a helical pattern around the combustor wall. Other patterns for the cooling passages 112 can be used, and the channel depths of the cooling passages can vary as suited for a given application, without departing from the scope of this disclosure. As shown in FIG. 6, an ignition boss 126 can be defined in the combustor wall 104 for passage of an ignitor 128 though the combustor wall 104, wherein the cooling passages 112 conform around the ignitor boss 126.

Returning again to FIG. 2, a multipoint fuel injection system 130 can be included in the combustor dome 106. The multipoint fuel injection system 130 includes a plurality of fuel injectors 132 with air passages extending through the combustor dome 106 for communication of compressor discharge air 134 through the combustor dome 106 into the combustor 102 for combustion in the interior 136 (between the inner and outer combustor wall portions 120, 122) of the combustor 102. The multipoint fuel injection system 130 includes a fuel manifold 138 in fluid communication with the fuel injectors 132 for injecting fuel with the compressor discharge air 134 for atomization of the fuel for combustion in the combustor 102. The manifold 138, combustor wall 104, and turbine inlet stator vanes 110 are all of a monolithic construction, e.g., produced by additive manufacturing. The manifold 138 can be a multistage manifold with a plurality of fluidly isolated fuel circuits 140 defined therein for staging fuel flow to the injectors 132. The manifold 138 can be mounted to an outer cowl 142 extending upstream of the combustor dome 106. It is also contemplated that in addition to or in lieu of the manifold 138, a similar manifold 146 can be mounted to an inner cowl 144.

With continued reference to FIG. 2, the manifold 138, combustor dome 106, combustor wall 104, and turbine inlet stator vane 110 are all within a high pressure engine case 148. The high pressure engine case 148 includes an inlet 150 for supplying the compressor discharge air 134. The combustor wall 104 can be spaced apart from both in inner case wall 152 of the high pressure engine case 148 radially inward from the inner combustor wall portion 120, and a radially outer case wall 154 of the high pressure engine case 148 radially outward from the outer combustor wall portion 122.

Figure 5:
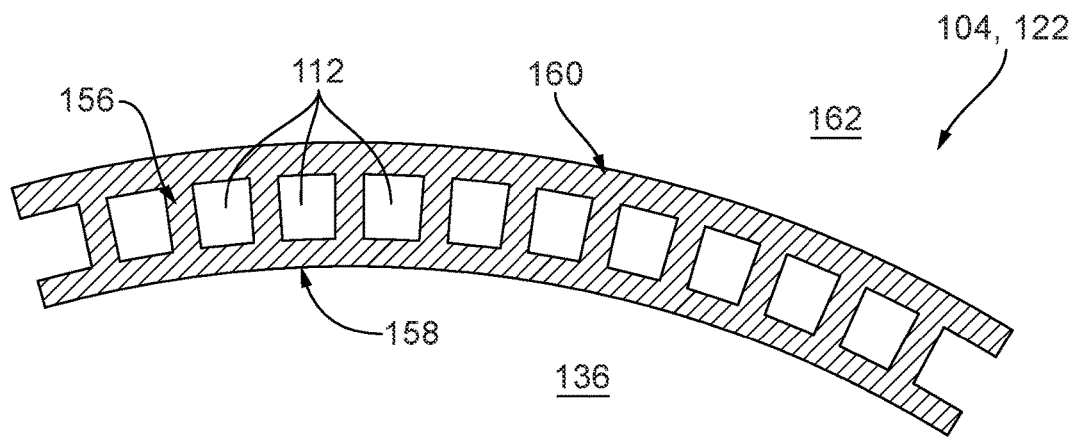
FIG. 5 is a schematic cross-sectional axial end elevation view of the cooling channels of FIG. 2.

With reference now to FIG. 5, the combustor wall 104 defines integral internal fins 156, defined circumferentially between the cooling passages 112, for conducting heat from an inner surface 158 of the combustor wall 104 to an outer surface 160 of the combustor wall 104 for heat transfer from the interior 136 of combustor wall 104 to a space 162 between the combustor wall 104 and the radially inner and outer case walls 152, 154, as labeled in FIG. 2. While FIG. 5 shows the internal fins 156 of the outer combustor wall portion 122, those skilled in the art will readily appreciate that similar internal fins 156 are included between the cooling passages 112 in the inner combustor wall portion 120 of FIG. 2.

With reference again to FIG. 1, a method includes supplying compressor discharge air 134 to an inlet 124 of the cooling passages 112 defined through the combustor wall 104 and cooling the combustor wall 104 with the compressor discharge air 134 flowing through the cooling passages 112. The method includes discharging the compressor discharge air 134 from an outlet 118 of each of the cooling passages 112 downstream of the turbine inlet stator vanes 110. Pressure drop between the inlets 124, which are effectively at a pressure of P3, of the cooling passages 112 and an area 164 downstream of the turbine inlet stator vanes 110, which is effectively at a pressure of P4, drives flow through the cooling passages 112. The pressure drop from P3 down to P4 can be 400 psi (2758 kPa), for example.

The method can include injecting compressor discharge air 134 and fuel through the combustor dome 106 at the upstream end 114 of the combustor wall 104 in in multipoint fuel injection for combustion within the combustor wall 104. The method can include staging flow of fuel in multipoint injection using the fluidly isolated fuel circuits 140 of the manifold 138. Substantially all of the compressor discharge air 134 can be accounted for in the multipoint injection and cooling the combustor wall 104. With the short flame length provided by multipoint injection, together with the integral construction of the combustor 102 and vanes 110, it is possible to cool the combustor with the cooling passages 112 as described herein. This construction also reduced part count, cost, and weight while improving durability relative to traditional systems and methods. Cooling air from the cooling passages 112 can be routed to other components downstream, e.g. for turbine vane cooling and the like.

The methods and systems of the present disclosure, as described above and shown in the drawings, provide for fuel injection with integral combustor and turbine vanes. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
an annular combustor including a combustor wall with a combustor dome at an upstream end of the combustor wall, and an outlet at a downstream end of the combustor wall opposite the upstream end, wherein the combustor wall includes an inner wall portion and an outer wall portion defining a full annular interior of the combustor therebetween, each of the inner wall portion and outer wall portion extending from the combustor dome to the downstream end of the combustor wall, wherein the combustor wall includes an air cooling passage embedded inside at least one of the inner wall portion and the outer wall portion, extending from the upstream end of the combustor wall, to the downstream end of the combustor wall; and
a multipoint fuel injection system in the combustor dome, wherein the multipoint fuel injection system includes a plurality of fuel injectors with air passages extending through the combustor dome for communication of compressor discharge air through the combustor dome into the combustor for combustion, wherein the multipoint fuel injection system includes a fuel manifold in fluid communication with the fuel injectors for injecting fuel with the compressor discharge air for atomization of the fuel for combustion in the combustor, wherein the manifold, the combustor wall, and a turbine inlet stator vane are together a single monolithic construction.

2. The system as recited in claim 1, further comprising the turbine inlet stator vane in the outlet of the combustor, wherein the air cooling passage has an outlet positioned downstream of the turbine inlet stator vane.

3. The system as recited in claim 1, wherein the air cooling passage is one of a plurality of circumferentially spaced apart cooling passages through the combustor wall, wherein the plurality of circumferentially spaced apart cooling passages through the combustor wall are embedded in the inner wall portion of the combustor wall and in the outer wall portion of the combustor wall.

4. The system as recited in claim 3, wherein each of the cooling passages has a respective inlet at the upstream end of the combustor wall and a respective outlet at the downstream end of the combustor wall, and does not include any other inlets or outlets.

5. The system as recited in claim 3, wherein the cooling passages follow a helical pattern around the combustor wall.

6. The system as recited in claim 3, further comprising an ignition boss defined in the combustor wall for passage of an ignitor though the combustor wall, wherein the cooling passages conform around the ignitor boss.

7. The system as recited in claim 1, further comprising a plurality of circumferentially spaced apart turbine inlet stator vanes in the outlet of the combustor.

8. The system as recited in claim 1, wherein the manifold is a multistage manifold with a plurality of fluidly isolated fuel circuits defined therein for staging flow to the injectors.

9. The system as recited in claim 1, wherein the manifold is mounted to a cowl extending upstream of the combustor dome.

10. The system as recited in claim 1, further comprising a high pressure engine case, wherein the manifold, the combustor dome, the combustor wall, and the turbine inlet stator vane are all within the high pressure engine case.

11. The system as recited in claim 10, wherein the high pressure engine case includes an inlet for supplying compressor discharge air, and wherein the combustor wall is spaced apart from both an inner case wall of the high pressure engine case radially inward from the combustor wall, and a radially outer case wall of the high pressure engine case radially outward from the combustor wall.

12. The system as recited in claim 11, wherein the combustor wall defines integral internal fins for conducting heat from an inner surface of the combustor wall to an outer surface of the combustor wall for heat transfer from the combustor wall to a space between the combustor wall and the radially inner and outer case walls.

13. A system comprising:
an annular combustor including a combustor wall with a combustor dome at an upstream end of the combustor wall, and an outlet at a downstream end of the combustor wall opposite the upstream end, wherein the combustor wall includes an inner wall portion and an outer wall portion defining a full annular interior of the combustor therebetween, each of the inner wall portion and outer wall portion extending from the combustor dome to the downstream end of the combustor wall, wherein the combustor wall includes an air cooling passage embedded inside at least one of the inner wall portion and the outer wall portion, extending from the upstream end of the combustor wall, to the downstream end of the combustor wall; and
a multipoint fuel injection system in the combustor dome, wherein the multipoint fuel injection system includes a plurality of fuel injectors with air passages extending through the combustor dome for communication of compressor discharge air through the combustor dome into the combustor for combustion, wherein the multipoint fuel injection system includes a fuel manifold in fluid communication with the fuel injectors for injecting fuel with the compressor discharge air for atomization of the fuel for combustion in the combustor, further comprising a high pressure engine case, wherein the manifold, the combustor dome, the combustor wall, and a turbine inlet stator vane are all within the high pressure engine case.

14. The system as recited in claim 13, wherein the high pressure engine case includes an inlet for supplying compressor discharge air, and wherein the combustor wall is spaced apart from both an inner case wall of the high pressure engine case radially inward from the combustor wall, and a radially outer case wall of the high pressure engine case radially outward from the combustor wall.

15. The system as recited in claim 14, wherein the combustor wall defines integral internal fins for conducting heat from an inner surface of the combustor wall to an outer surface of the combustor wall for heat transfer from the combustor wall to a space between the combustor wall and the radially inner and outer case walls.

* * * * *